United States Patent
Peroulas et al.

(10) Patent No.: US 10,952,081 B2
(45) Date of Patent: Mar. 16, 2021

(54) DETECTING RADIO COVERAGE PROBLEMS

(71) Applicant: Google LLC, Mountain View, CA (US)

(72) Inventors: James Peroulas, San Mateo, CA (US); Sharath Ananth, Cupertino, CA (US); Nachiappan Valliappan, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 101 days.

(21) Appl. No.: 15/903,756

(22) Filed: Feb. 23, 2018

(65) Prior Publication Data

US 2019/0268779 A1  Aug. 29, 2019

(51) Int. Cl.

| | |
|---|---|
| H04W 16/18 | (2009.01) |
| H04W 24/06 | (2009.01) |
| H04W 88/08 | (2009.01) |
| H04W 48/16 | (2009.01) |
| H04W 16/00 | (2009.01) |
| G06N 3/02 | (2006.01) |
| H04W 24/10 | (2009.01) |
| H04W 24/02 | (2009.01) |

(52) U.S. Cl.
CPC .......... *H04W 16/18* (2013.01); *H04W 16/00* (2013.01); *H04W 24/06* (2013.01); *H04W 48/16* (2013.01); *H04W 88/08* (2013.01); *G06N 3/02* (2013.01); *H04W 24/02* (2013.01); *H04W 24/10* (2013.01)

(58) Field of Classification Search
CPC ..... H04W 16/18; H04W 16/00; H04W 24/08; H04W 64/00; H04W 64/003; H04W 4/02; H04W 4/025; H04W 28/0226; H04W 28/0231; H04W 52/0245; G01S 5/0252; G01S 5/0027; G01S 5/0242; G01S 5/0278; G08G 1/0969; G09B 29/00; G06F 16/29; G06K 9/036; H04B 17/318; H04B 17/27
USPC .............. 455/446, 456.1, 67.11, 115.3, 457; 340/995, 8.1, 990; 370/332; 345/426, 345/589, 592; 701/516; 702/5
See application file for complete search history.

(56) References Cited

U.S. PATENT DOCUMENTS

| | | | |
|---|---|---|---|
| 8,150,344 B1* | 4/2012 | Goyal | H04W 24/02 455/130 |
| 2003/0125046 A1* | 7/2003 | Riley | G01S 5/0205 455/456.1 |
| 2015/0005000 A1* | 1/2015 | Gyorfi | H04W 64/006 455/456.1 |
| 2019/0036630 A1* | 1/2019 | Svennebring | H04B 17/373 |

* cited by examiner

Primary Examiner — Elton Williams
(74) Attorney, Agent, or Firm — Honigman LLP; Brett A. Krueger

(57) ABSTRACT

A method for detecting coverage problems is provided. The method includes receiving, at data processing hardware, from at least one user equipment (UE), observations. Each observation includes a signal measurement of a signal emitted from a base station and a corresponding location of the signal measurement. The method also includes generating, by the data processing hardware, a coverage map for the base station based on the received observations, the coverage map indicating a signal characteristic of the emitted signal about the base station. The method further includes determining, by the data processing hardware, an estimated characteristic of the base station by feeding the coverage map into a neural network configured to output the estimated characteristic of the base station.

30 Claims, 12 Drawing Sheets

DETECTING RADIO COVERAGE PROBLEMS

TECHNICAL FIELD

This disclosure relates to detecting radio coverage problems.

BACKGROUND

Wireless communication networks (e.g., cellular networks) provide communication content such as voice, video, packet data, messaging, and broadcast for user equipment (UE), such as mobile devices and data terminals. The communication network may include a number of base stations that can support communication for a number of user equipment across dispersed geographic regions.

In some configurations, wireless networks are rather large and may employ a large number of base stations. These larger networks may have extensive site plans where telecommunication operators deploy many base stations (e.g., thousands of base stations). With respect to these base stations, site plans often dictate base station details, such as antenna location, antenna feeder cables, antenna tilt angle, antenna azimuth, etc. Typically, these details and specifications for site plans have been preconfigured for network performance. Yet during network operation, it is not uncommon for user equipment to experience network issues as a result of site plan deviation.

SUMMARY

One aspect of the disclosure provides a method for detecting radio or signal coverage problems. The method includes receiving, at data processing hardware, from at least one user equipment (UE) (e.g., any device capable of receiving signal emissions), observations. Each observation includes a radio signal measurement of a signal (e.g., a radio signal, WiFi signal, etc.) emitted from a base station and a corresponding location of the signal measurement. The method also includes generating, by the data processing hardware, a coverage map for the base station based on the received observations. The coverage map indicates a signal characteristic of the emitted signal about the base station. The method may further include generating, by the data processing hardware, an observation map based on the coverage map and the observations. The method includes determining, by the data processing hardware, an estimated characteristic of the base station by feeding the coverage map into a neural network configured to output the estimated characteristic of the base station. In some examples, the method includes determining, by the data processing hardware, an estimated characteristic of the base station by feeding the coverage map and the observation map into a neural network configured to output the estimated characteristic of the base station. In some implementations, the signal measurement includes a location uncertainty measurement.

Implementations of the disclosure may include one or more of the following optional features. In some implementations, generating the coverage map for the base station includes dividing a coverage area about the base station into pixels, each pixel corresponding to a geographical portion of the coverage area. Here, for each observation, the method may include identifying the pixel having the corresponding geographical portion of the coverage area that contains the location of the signal measurement of the respective observation and associating the observation with the identified pixel. For each pixel, the method may include averaging the signal measurements of any observations associated with the respective pixel. For example, associating the observation with the identified pixel may include placing the observation in a pixel bin associated with the identified pixel.

In some examples, the coverage map includes a grid having cells, and each pixel corresponds to one of the cells. Generating the observation map may also include, for each pixel of the coverage map, generating a metric that monotonically expresses a number of any observations associated with the respective pixel. When generating the coverage map for the base station, the method may include generating a terrain map of a geographical area about the base station and feeding the terrain map into the neural network. The terrain map may describe at least one of a terrain altitude of the geographical area or a presence and/or height of objects extending above a ground surface of the geographical area.

In some configurations, when generating a metric that monotonically expresses a number of any observations associated with the respective pixel, the metric includes at least one of: a number of any observations associated with the respective pixel; a log of the number of any observations associated with the respective pixel; or a monotonic function of the number of any observations associated with the respective pixel. Additionally or alternatively, the metric may include determining a number of any observations associated with the respective pixel, when the number is greater than zero, assigning a value of the respective pixel to one and when the number equals zero, assigning the value of the respective pixel to zero.

In some implementations, the method includes feeding side information into the neural network, the side information including at least one of a frequency of operation of the base station, a height of an antenna of the base station, an antenna beam width, an antenna tilt angle, or a predetermined location of the base station. The characteristic of the base station may include an estimated location of the base station, an estimated pointing direction of the base station, or an antenna azimuth of the base station. Optionally, the neural network may be configured to output a confidence indicator of the estimated characteristic of the base station.

Optionally, the method includes generating, by the data processing hardware, a location uncertainty map based on location uncertainty measurements. The method may also include determining, by the data processing hardware, the estimated characteristic of the base station by feeding the coverage map and the location uncertainty map into the neural network configured to output the estimated characteristic of the base station.

In some examples, generating the location uncertainty map for the base station includes dividing a coverage area about the base station into pixels, each pixel corresponding to a geographical portion of the coverage area. Here, for each observation, the method may include identifying the pixel having the corresponding geographical portion of the coverage area that contains the location of the location uncertainty measurement of the respective observation and associating the observation with the identified pixel. For each pixel, the method may include averaging the location uncertainty measurements of any observations associated with the respective pixel.

Another aspect of the disclosure provides a system for detecting signal coverage problems. The system includes data processing hardware and memory hardware in communication with the data processing hardware, the memory hardware storing instructions that when executed on the data processing hardware cause the data processing hardware to perform operations. The operations includes receiving from at least one user equipment (UE), observations, each observation comprising a signal measurement of a signal emitted from a base station and a corresponding location of the signal measurement. The operations also include generating a coverage map for the base station based on the received observations, the coverage map indicating a signal characteristic of the emitted signal about the base station and generating an observation map based on the coverage map and the observations. The operations may further include generating an observation map based on the coverage map and the observations. The operations also include determining an estimated characteristic of the base station by feeding the coverage map into a neural network configured to output the estimated characteristic of the base station. In some examples, the operations include determining an estimated characteristic of the base station by feeding the coverage map and the observation map into a neural network configured to output the estimated characteristic of the base station. In some implementations, the signal measurement includes a location uncertainty measurement.

This aspect may include one or more of the following optional features. In some examples, the operation of generating the coverage map for the base station includes dividing a coverage area about the base station into pixels, each pixel corresponding to a geographical portion of the coverage area. For each observation, the operation may include identifying the pixel having the corresponding geographical portion of the coverage area that contains the location of the signal measurement of the respective observation and associating the observation with the identified pixel. For each pixel, the operation may include averaging the signal measurements of any observations associated with the respective pixel. For example, associating the observation with the identified pixel may include placing the observation in a pixel bin associated with the identified pixel.

In some implementations, the coverage map includes a grid having cells, and each pixel corresponds to one of the cells. The operation of generating the observation map may include, for each pixel of the coverage map, generating a metric that monotonically expresses a number of any observations associated with the respective pixel. The metric may include at least one of a number of any observations associated with the respective pixel, a log of the number of any observations associated with the respective pixel, or a monotonic function of the number of any observations associated with the respective pixel. Optionally, generating the metric may include determining a number of any observations associated with the respective pixel, when the number is greater than zero, assigning a value of the respective pixel to one and when the number equals zero, assigning the value of the respective pixel to zero.

In some configurations, the operation of generating the coverage map for the base station includes generating a terrain map of a geographical area about the base station and feeding the terrain map into the neural network. The terrain map may describe at least one of a terrain altitude of the geographical area or a presence and/or height of objects extending above a ground surface of the geographical area. Optionally, the operations may include feeding side information into the neural network, the side information including at least one of a frequency of operation of the base station, a height of an antenna of the base station, an antenna beam width, an antenna tilt angle, or a predetermined location of the base station. The estimated characteristic of the base station may include an estimated location of the base station, an estimated pointing direction of the base station, or an antenna azimuth of the base station. The neural network may be configured to output a confidence indicator of the estimated characteristic of the base station.

Optionally, the operation include generating a location uncertainty map based on location uncertainty measurements. The operations may also include determining the estimated characteristic of the base station by feeding the coverage map and the location uncertainty map into the neural network configured to output the estimated characteristic of the base station.

In some examples, generating the location uncertainty map for the base station includes dividing a coverage area about the base station into pixels, each pixel corresponding to a geographical portion of the coverage area. Here, for each observation, the operations may include identifying the pixel having the corresponding geographical portion of the coverage area that contains the location of the location uncertainty measurement of the respective observation and associating the observation with the identified pixel. For each pixel, the system may include averaging the location uncertainty measurements of any observations associated with the respective pixel.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Like any project, telecommunication operators may have to modify site plans during the deployment of base stations. For example, it generally proves difficult to deploy a large number of base stations without some degree of deviation from original site plans. Telecommunication operators may have to move antenna locations (e.g., due to site deployment terrain) or swap feeder cables (e.g., cable supply issues). In other examples, telecommunication operators simply make inadvertent errors when deploying the infrastructure for networks. In the case of large networks, small errors may be amplified over a large site and/or system. Whether these deviations are minor or major, these deviations may affect later network performance during network operation. Issues caused by these deviations may even go undetected for long periods of time. Unfortunately, to verify the operation of each and every transmitter (e.g., base station) is usually prohibitively expensive. As a result, there is a need to detect signal coverage problems during network operation. With user equipment (UE) devices operating within a geographic coverage area of the base station, server devices receiving information from the UE devices may use predictive modeling to detect characteristics for a given base station. An advantage of this UE feedback detection based system is that the network provider or network manager may virtually verify characteristics of network infrastructure (e.g., base stations) without a need to physically verify the network infrastructure. The concepts disclosed may also be applied to signal coverage detection for WiFi access point and other signal emitting devices.

Figure 1:
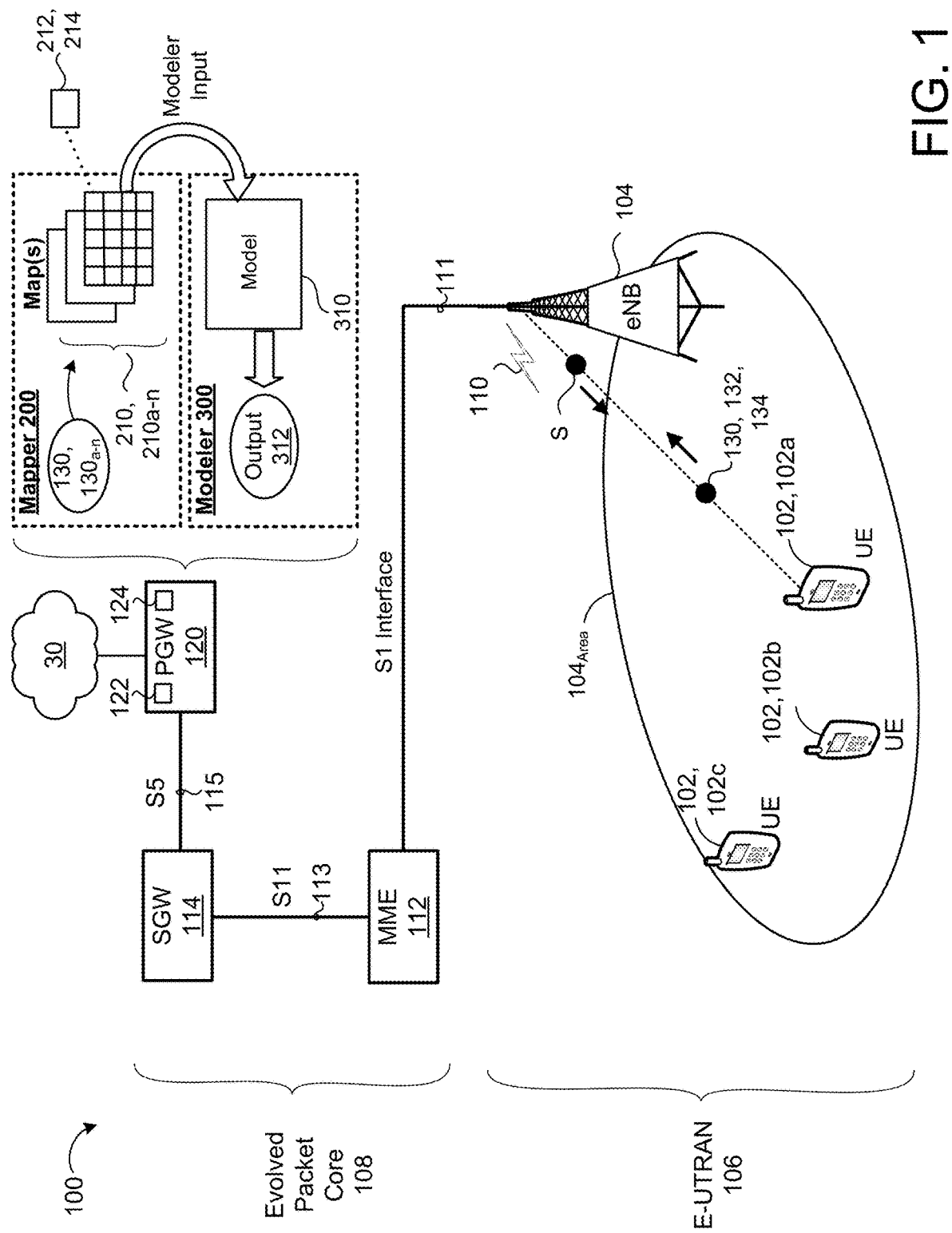
FIG. 1 is a schematic view of an example communication network.

FIG. 1 depicts an example communication network 100, which may be a Long-Term Evolution (LTE) network, a 5G network, and/or a multiple access network supporting numerous access technologies specified by the $3^{rd}$ Generation Partnership Project (3GPP), such as the General Packet Radio Service (GPRS), the Global System for Mobile Communications/Enhanced Data Rates for GSM Evolution (GSM/EDGE), the Universal Mobile Telecommunication System/High Speed Packet Access (UMTS/HSPA), LTE and LTE advanced network technologies. LTE is a standard for wireless communication of high-speed data packets between user equipment 102, 102a-c, such as mobile phones and data terminals, and base stations 104. LTE is based on the GSM/EDGE and UMTS/HSPA network technologies. LTE is configured to increase the capacity and speed of the telecommunication by using different radio interfaces in addition to core network improvements. LTE supports scalable carrier bandwidths, from 1.4 MHz to 20 MHz and supports both frequency division duplexing (FDD) and time-division duplexing (TDD). In other examples, the communication network 100 is a WiFi network or other wireless signal network. The user equipment 102 may be interchangeably referred to as user equipment (UE) devices and mobile devices 102.

The UE devices 102, 102a-c may communicate with an external network 30, such as a packet data network (PDN), through the communication network 100 (or 5G/3G/2G network). In the example shown, the network 100 includes a first portion, an Evolved Universal Terrestrial Radio Access Network (e-UTRAN) portion 106, and a second portion, an Evolved Packet Core (EPC) portion 108. The first portion 106 includes an air interface 110 (i.e., Evolved Universal Terrestrial Radio Access (e-UTRA)) of 3GPP's LTE upgrade path for mobile networks, UE devices 102, and base station 104. The LTE air interface 110 uses orthogonal frequency-division multiple access (OFDMA) radio-access for the downlink and Single-carrier FDMA (SC-FDMA) for the uplink. Accordingly, the first portion 106 provides a radio access network (RAN) that supports radio communication of data packets and/or other surfaces from the external network to the UE devices 102 over the air interface 110 via one or more base stations 104.

The EPC 108 provides a framework configured to converge voice and data on the communication network 100. The EPC 108 unifies voice and data on an Internet Protocol (IP) service architecture and voice is treated as just another IP application. The EPC 108 includes several key components that include, without limitations, a Mobility Management Entity (MME) 112, a Serving Gateway (SGW) 114, and a Packet Data Node Gateway (PGW) 120. The PGW 120 may be referred to as a network gateway device 120, and when the network corresponds to a 3G network, the network gateway device 120 includes a Gateway GPRS Support Node (GGSN) instead of the PGW 120. Optionally, when the network corresponds to a 5G or 5G+ network, the network gateway device 120 may include a gateway node with a naming convention as defined by the 5G and/or 5G+ network. The MME 112, the SGW 114, and the PGW 120 may be standalone components, or at least two of the components may be integrated together. The EPC 108 communicates with the UE devices 102 and the external network 30 to route data packets therebetween.

The MME 112 is a key control-node for the communication network 100. The MME 112 manages sessions and states and authenticates and tracks a UE device 102 across the network 100. For instance, the MME 112 may perform various functions such as, but not limited to, control of signaling and security for a Non Access Stratum (NAS), authentication and mobility management of UE devices 102, selection of gateways for UE devices 102, and bearer management functions. The SGW 114 performs various functions related to IP data transfer for UE devices 102, such as data routing and forwarding, as well as mobility anchoring. The SGW 114 may perform functions such as buffering, routing, and forwarding of data packets for UE devices 102. The SGW 114 and the MME 112 also communicate with one another over an S11 interface 113.

The PGW 120 (i.e., network gateway device) performs various functions such as, but not limited to, internet protocol (IP) address allocation, maintenance of data connectivity for UE devices 102, packet filtering for UE devices 102, service level gating control and rate enforcement, dynamic host configuration protocol (DHCP) functions for clients and servers, and gateway general packet radio service (GGSN) functionality. The PGW 120 communicates with the SGW 114 over an S5 interface 115.

Each base station 104 has a coverage area $104_{Area}$ that generally corresponds to a geographic area where a UE device 102 may receive a radio signal S emitted from the base station 104. In some implementations, the base station 104 includes an evolved Node B (also referred as eNode B or eNB). An eNB 104 includes hardware that connects to the air interface 110 (e.g., a mobile phone network) for communicating directly with the UE devices 102. For instance, the eNB 104 may transmit downlink LTE/3G/5G signals (e.g., communications) to the UE devices 102 and receive uplink LTE/3G/5G signals from the UE devices 102 over the air interface 110. The eNBs 104 use an S1 interface 111 for communicating with the EPC 108. The S1 interface 111 may include an S1-MME interface for communicating with the MME 112 and an S1-U interface for interfacing with the SGW 114. Accordingly, the S1 interface 111 is associated with a backhaul link for communicating with the EPC 108. In additional implementations, the base station 104 is a wireless access point or other wireless signal emitter.

UE devices 102 may be any telecommunication device that is capable of transmitting and/or receiving voice/data over the network 100. UE devices 102 may include, but are not limited to, mobile computing devices, such as laptops, tablets, smart phones, and wearable computing devices (e.g., headsets and/or watches). UE devices 102 may also include other computing devices having other form factors, such as computing devices included in desktop computers, vehicles, gaming devices, televisions, or other appliances (e.g., networked home automation devices and home appliances).

In some implementations, data processing hardware 122 of the network gateway device 120 (e.g., PGW or GGSN or a gateway node with another naming convention as defined by 5G and/or 5G+ networks) receives from at least one UE device 102 (e.g., shown as UE 102a-c) observations 130 (i.e. observation data). The data processing hardware 122 may receive the observations 130 based on interaction(s) the at least one UE device 102 has with the network 100 within the coverage area $104_{area}$ of the base station 104. Each observation 130 includes a radio signal measurement 132 of the radio signal S emitted from the base station 104 and a corresponding location 134 of the radio signal measurement 132. The location 134 refers to coordinates of the UE device 102 at a time the observation 130 is transmitted. For example, the location 134 is a global longitude and/or latitude of the UE device 102. In other examples, the location 134 refers to a position relative to an object, such as the base station 104 emitting the radio signal S measure by an observation 130. In some examples, the radio signal measurement 132 is a measurement of signal strength. Some examples of measurements of signal strength include received signal strength indicators (RSSI), reference signal received power (RSRP), reference signal received quality (RSRQ), and/or timing advance. In some implementations, each observation 130 corresponds to a particular base station 104. In other implementations, each observation 130 corresponds to more than one base station 104 (e.g., adjacent base stations near the UE 102). When each observation 130 corresponds to more than one base station 104, the observation 130 may be parsed according to each observed base station 104. For example, the network gateway device 120 determines a particular base station 104 corresponding to an observation 130 received from an UE device 102 and may estimate characteristics of the particular base station 104 based on the observation 130 or a collection of observations 130 from multiple UE devices 102 within the coverage area $104_{Area}$ corresponding to the base station 104.

Referring to FIG. 1, the communication network 100 further includes a mapper 200 and a modeler 300. The mapper 200 and/or the modeler 300 may be implemented by the data processing hardware 122 of the network gateway device 120. In some examples, the mapper 200 and/or the modeler 300 are executed by data processing hardware corresponding to the external network 30. For example, the external network 30 may be a distributed system (e.g., a cloud environment) with its own data processing hardware or shared data processing hardware (e.g., shared with the network gateway device 120). In yet other examples, the mapper 200 and the modeler 300 are implemented on different data processing hardware in communication within the communication network 100.

Generally, the mapper 200 is configured to generate maps 210, 210a-n for a given base station 104 based on the received observations 130 corresponding to that base station 104. Some examples of maps 210 generated by the mapper 200 for a given base station 104 include a coverage map 210a, an observation map 210b, and a terrain map 210c. Each of these maps 210 may include different types of map information 212 relating to the received observations 130. In some examples, each map 210 represents the coverage area $104_{area}$ for a base station 104, but varies with regard to map information 212 depicted within that coverage area $104_{area}$. For instance, a map 210 is divided into geographic portions 214 (i.e. geographic subsections) sometimes referred to as pixels, bins, or cells. In other words, these geographic portions 214 may be units of the coverage area $104_{area}$. For example, when the coverage area $104_{area}$ for a base station 104 is one hundred square kilometers, the coverage area $104_{area}$ is divided into a 10×10 grid with units of one square kilometer geographic portions 214. Here, more granular geographic portions 214 (i.e. smaller geographic areas) may correspond to greater accuracy at the modeler 300 (e.g., more accurate estimated characteristics 312 for a base station 104). Once the mapper 200 generates at least one map 210, the at least one map 210 is then fed as an input into a model 310 of the modeler 300 to output estimated characteristics 312 for the base station 104.

The modeler 300 is generally configured to receive inputs (e.g., maps 210 from the mapper 200) and output estimated characteristics 312 of a base station 104 associated with the map(s) 210. The modeler 300 may be designed such that it may receive any number of maps 210 generated by the mapper 200. In some examples, the modeler 300 has models 310 that correspond to different combination of maps 210. For example, an input of a particular combination of maps 210 outputs a particular estimated characteristic 312 for the base station 104. Some examples of these estimated characteristics 312 include an estimated location (e.g., coordinate location) of the base station 104, an estimated pointing direction of the base station 104, an antenna azimuth of the base station 104, or an uncertainty estimate related to a characteristic of the base station 104 or UE device 102.

In some examples, the models 310 of the modeler 300 correspond to algorithms configured to determine the output of a particular estimated characteristic 312. In other examples, a model 310 is a machine learning model 310 where the model 310 is taught (or trained) based on data sets and result sets to predict its own output based on input data similar to the data sets. For example, the model 310 receives radio signal measurements 132 associated with a base station 104 and based on an aggregate of the radio signal measurements 132, predicts the location of the base station 104 as an estimated characteristic 312. In some examples, operators of a base station 104 train a model 310 with training data corresponding to the base station 104 and, based on iterative learning, enable the model 310 to determine estimated characteristics 312 for a different base station 104 and/or different operator based on observations 130 associated with that different base station 104. In other examples, the operators of a base station 104 who train a model 310 may then use the model 310 to determine estimated characteristics 312. For instance, the estimated characteristics 312 can identify anomalies when compared to expected characteristics. Detection of these anomalies has the benefit that it may inform an operator of potential issues related to the base station 104 (e.g., discrepancies with antenna azimuth, pointing direction, or location) or confirm issues being experienced by UE devices 102.

Additionally or alternatively, the model 310 is a neural network 310 that is fed the map(s) 210 as inputs and configured to output the estimated characteristics 312 of the base station 104. The neural network 310 may be a convolution neural network (CNN) or a deep neural network (DNN). In some examples, the model 310 is a combination of a convolution neutral network and a deep neutral network such that the convolution neural network filters, pools, then flattens information to send to a deep neural network. Much like a machine learning model 310, a neural network 310 is trained to generate meaningful outputs that may be used as accurate estimated characteristics 312. For example, when training a neural network 310 to output the estimated characteristic 312 of the location of a base station 104, a mean squared error loss function trains the neural network 310. Typically for training purposes, data is segregated into training and evaluation sets (e.g., 90% training and 10% evaluation) and the neural network 310 is trained until a performance of the neural network 310 on the evaluation set stops decreasing. Once the performance stops decreasing on the evaluation set, the neural network 310 may be ready to determine estimated characteristics 312 based on map(s) 210 with map information 212 related to observations 130.

As an illustration, the neural network 310 may function like an image recognition neural network. In an image recognition neural network, the neural network receives layers of an image. For example, these layers may correspond to colors, such as red, green, and blue (i.e. RGB). With layers of the image and a trained familiarity with the colors red, green, and blue, the neural network is configured to identify the image. Here, much like the color layers (i.e. red, green, and blue), the modeler 300 receives map(s) 210. With the map(s) 210 and a trained familiarity with the types of maps 210 provided to the modeler 300, the model 310 (e.g., the neural network 310) is configured to identify estimated characteristics 312 of the base station 104.

Figure 2A:
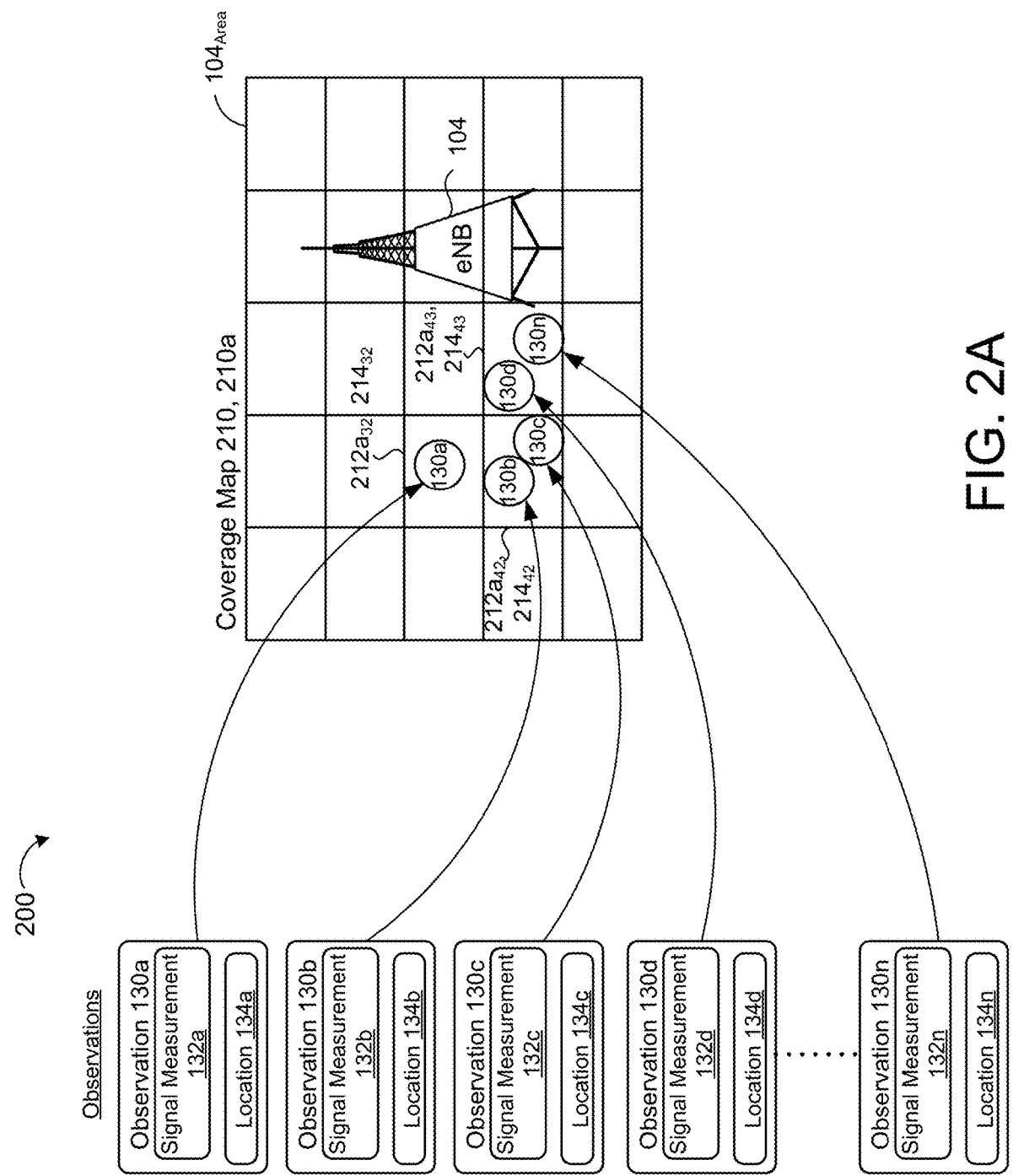
FIG. 2A is a schematic view of an example coverage map.

FIG. 2A is an example of a mapper 200 generating maps 210 for a base station 104. FIG. 2A depicts the generated map 210 as a coverage map 210, 210a. The coverage map 210a corresponds to a geographic area referred to as the coverage area $104_{area}$ of a base station 104. Typically, the mapper 200 determines the coverage area $104_{area}$ of the coverage map 210a from each observation 130 received by the data processing hardware 122. An observation 130 commonly contains data (e.g., metadata) identifying the base station 104 emitting the radio signal S measured as the radio signal measurement 132 of the observation 130. Therefore, a collection of all observations 130, 130a-n associated with a base station 104 define geographic boundaries of the coverage map 210a.

In some examples, the coverage map 210a indicates, as map information 212, at least one radio signal characteristic 212a of the emitted radio signal S about the base station 104. The radio signal characteristic 212a may relate to a single received observation 130 or a collection of received observations 130. In some implementations, the mapper 200 determines an average radio signal measurement 212a for a cluster of radio signal measurements 132a in a similar location 134a. In other implementations, the mapper 200 determines a variance 212a corresponding to a cluster radio signal measurements 132a in a similar location 134a. Additionally or alternatively, the mapper 200 may determine both an average and a variance for a cluster of radio signal measurements 132a in a similar location 134a as radio signal characteristics 212.

In some configurations, the mapper 200 generates the coverage map 210a for the base station 104 by dividing a coverage area $104_{area}$ into pixels (e.g., geographic portions 214). For example, FIG. 2A illustrates the coverage map 210a divided into a matrix (or grid). Each cell of this matrix (or grid) may represent a pixel referring to a geographic portion 214. As seen in the example FIG. 2A, for each observation 130, 130a-n, the mapper 200 identifies the pixel having the corresponding geographic portion 214 of the coverage area $104_{area}$ that contains the location 134 of the radio signal measurement 132 of the respective observation 130. The mapper 200 may associate the observation 130 with the identified pixel. For example, observation 130a has a signal measurement 132a at location 134a that corresponds to geographic portion $214_{32}$, where "32" is the third row and the second column pixel associated with location 134a. Similarly, location 134b of observation 130b corresponds to geographic portion $214_{42}$. Location 134c of observation 130c also maps to geographic portion $214_{42}$. Location 134d of observation 130d corresponds to geographic portion $214_{43}$ and location 134n of observation 130n maps to geographic portion $214_{43}$ as well. With the locations 134 of each observation 130 for the base station 104 mapped along with the radio signal measurement 132 at that location 134, the mapper 200 may generate radio signal characteristics 212 as map information 212 for each pixel. As previously stated, for each pixel, the mapper 200 may determine the average (e.g., a RSRP value) and/or the variance of the radio signal measurements 132 of any observations 130 associated with the respective pixel. Referring further to FIG. 2A, the mapper 200 generates the average (e.g., a RSRP value) and/or the variance as radio signal characteristics $212a_{32}$, $212a_{43}$, and $212a_{42}$ for the respective pixels $214_{32}$, $214_{43}$, and $214_{42}$. Additionally or alternatively, the coverage map 210a may include data structures, referred to as bins, for each pixel, cell, and/or geographic portion 214 where an observation 130 associated with the pixel, cell, and/or geographic portion 214 may be stored. An advantage of bins is that the data structure of the coverage map 210a may enable to mapper 200 to quickly generate additional maps 210 (e.g., observation maps 210b) from the observations 130 within the bins. This may prevent the mapper 200 from once again mapping the locations 134 of the observations 130.

Figure 2B:
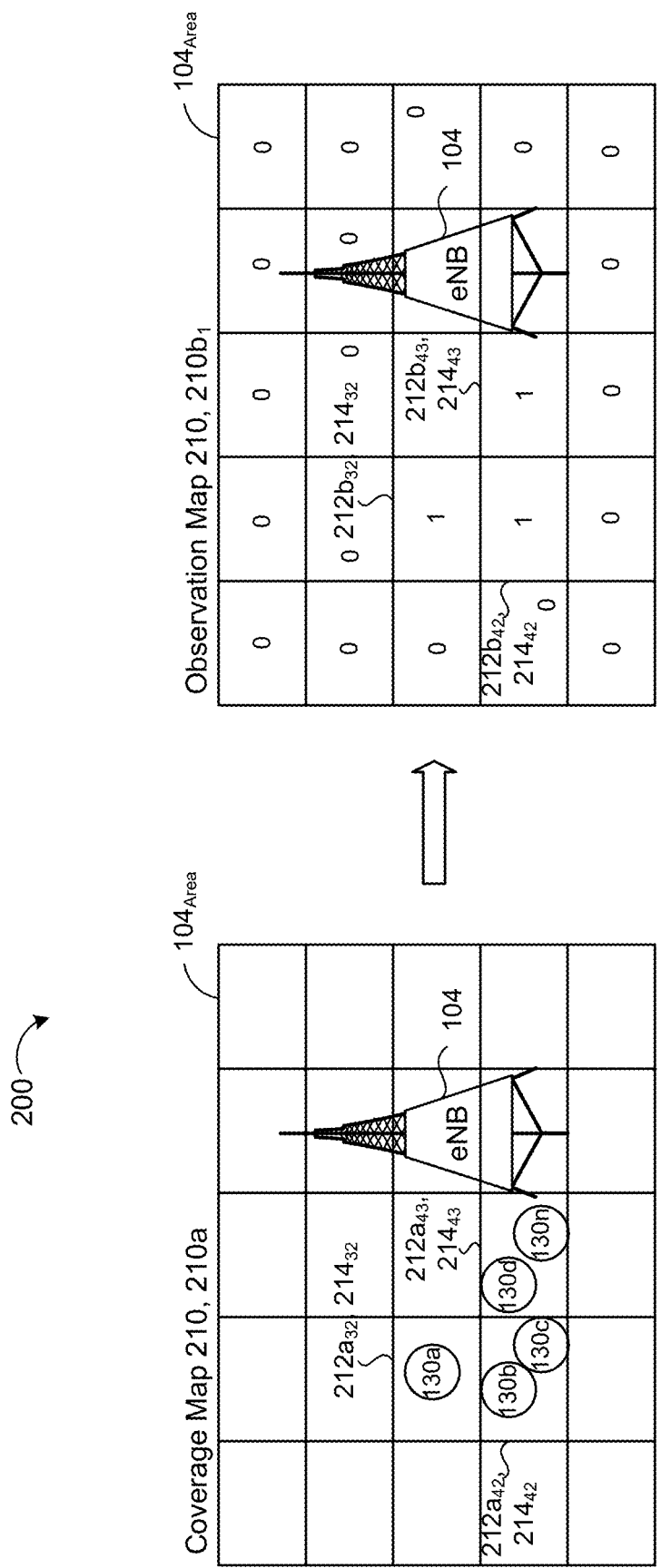
FIGS. 2B and 2C are schematic views of example observation maps.

FIG. 2B is an example of the mapper 200 generating an observation map 210, 210b based on the coverage map 210a and the observations 130. With respect to the observation map 210b, the map information 212 refers to a metric 212b, generated by the mapper 200, that expresses the presence of an observation 130 in a geographic portion 214 (e.g., pixel or cell) of the coverage map 210a. The metric 212b may be a number N of observations 130 associated with a geographic portion 214 (e.g., pixel or cell), a log of the number N of any observations 130 associated with a respective geographic portion 214 (e.g., pixel or cell), or a monotonic function of the number N of any observations 130 associated with the respective geographic portion 214 (e.g., pixel or cell).

Figure 2C:
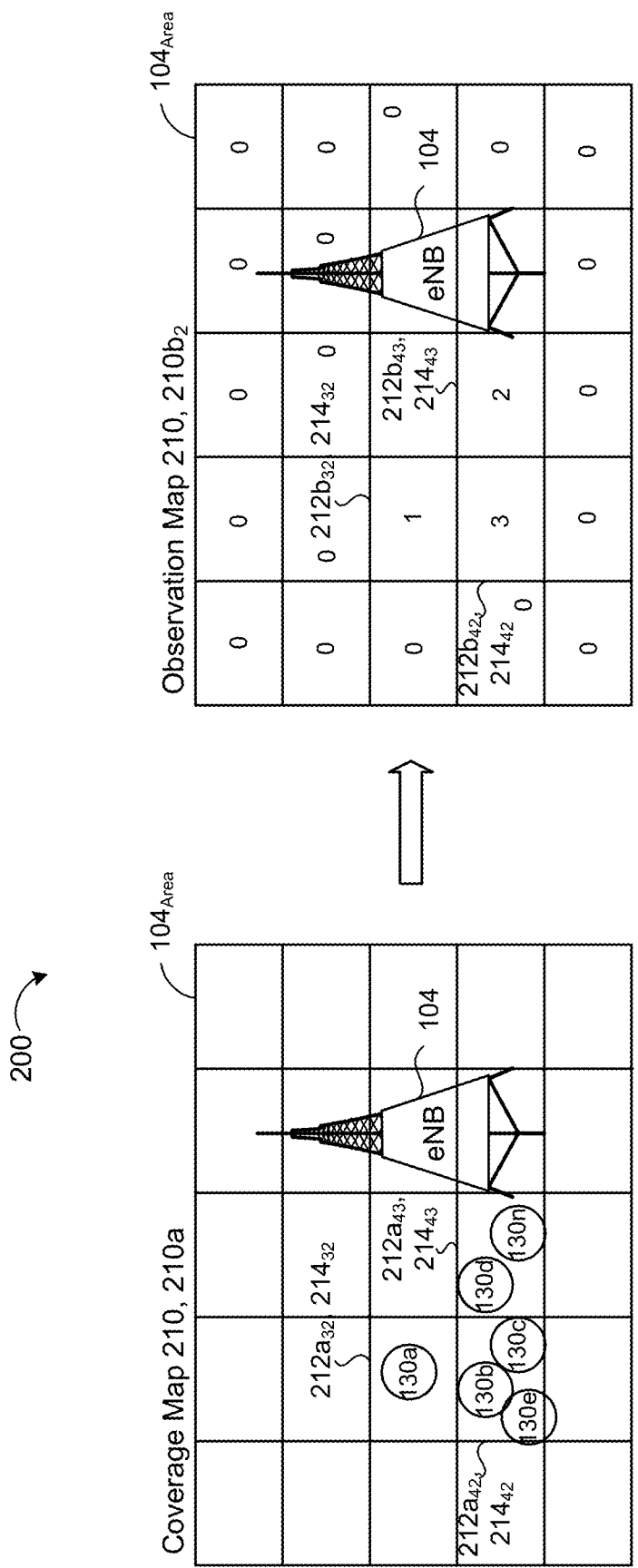

In some configurations, the mapper 200 generates the metric 212b by determining a number N of any observations 130 associated with a respective geographic portion 214 (e.g., pixel or cell). When the number N is greater than zero, the mapper 200 assigns a value to the respective geographic portion 214 (e.g., pixel or cell). The value may be a "1" or a number that corresponds to the number N of observations 130. When the number N equals zero, the mapper 200 assigns the value of "0" to the respective geographic portion 214 (e.g., pixel or cell). For example FIG. 2B illustrates the metric 212b is a binary metric where a "0" is assigned to a geographic portion 214 when the geographic portion 214 does not contain any observation 130 and where a "1" is assigned to a geographic portion 214 when the geographic portion 214 contains one or more observation 130. In this example, only geographic portions $214_{32}$, $214_{43}$, and $214_{42}$ of the observation map $210b_1$ are assigned a value of "1"; while all other geographic portions 214 are assigned a value of "0." In some examples, the modeler 300 may skip geographic portion 214 assigned a value of "0." In models 310 with machine learning and/or neutral networks, the model 310 may, over time, also learn to skip geographic portion 214 assigned a value of "0" during the modeling process. In other implementations, such as FIG. 2C, the value assigned as a metric 212b to a geographic portion 214 of the observation map $210b2$ directly corresponds to the number N of observations 130 within that geographic portion 214. Here, because geographic portions $214_{32}$, $214_{43}$, and $214_{42}$ correspond to 1, 2, and 3 observations 130, the observation map $210b_2$ assigns geographic portions $214_{32}$, $214_{43}$, and $214_{42}$ a value of 1, 2, and 3, respectively.

Although the observation map 210b may seem like a redundant map to provide to the modeler 300 in light of the coverage map 210a, each map 210a, 210b provided to the modeler 300 may provide different degrees of accuracy for outputs (e.g., the estimated characteristic 312) determined by the modeler 300. In some examples, the modeler 300 outputs a confidence indicator 314 for the estimated characteristic 312. Here, the observation map 210b enables the modeler 300 to output a confidence indicator 314 for the estimated characteristic 312 based on the number of observations 130 indicated in provided observation maps 210b. For example, the modeler 300 has a higher confidence indicator 314 when the observation map 210b corresponds to a significant number of observations 130. In other words, the modeler 300 gains confidence in the estimated characteristics 312 of the base station 104 when the estimated characteristics 312 are based on a larger volume of observations 130 (i.e., data measurements to generate the estimated characteristics 312). In yet other examples, the modeler 300 outputs a confidence indictor 314 without an observation map 210b such that a model 310 of the modeler 300 may be configured to determine the confidence indicator 314 based on other map information 212 provided with the map(s) 210 input into the modeler 300.

Figure 2D:
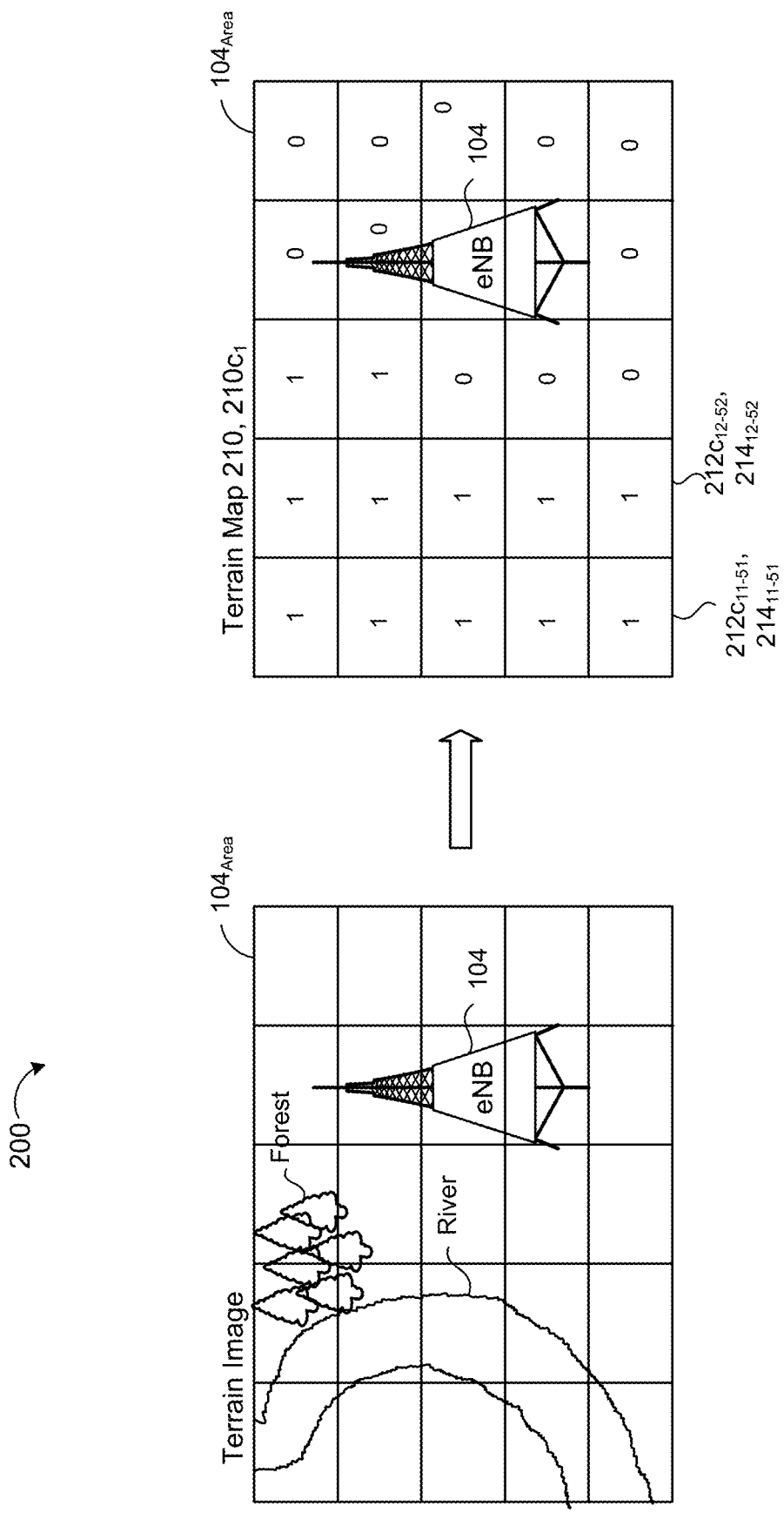
FIGS. 2D and 2E are schematic views of example terrain maps.
Figure 2E:
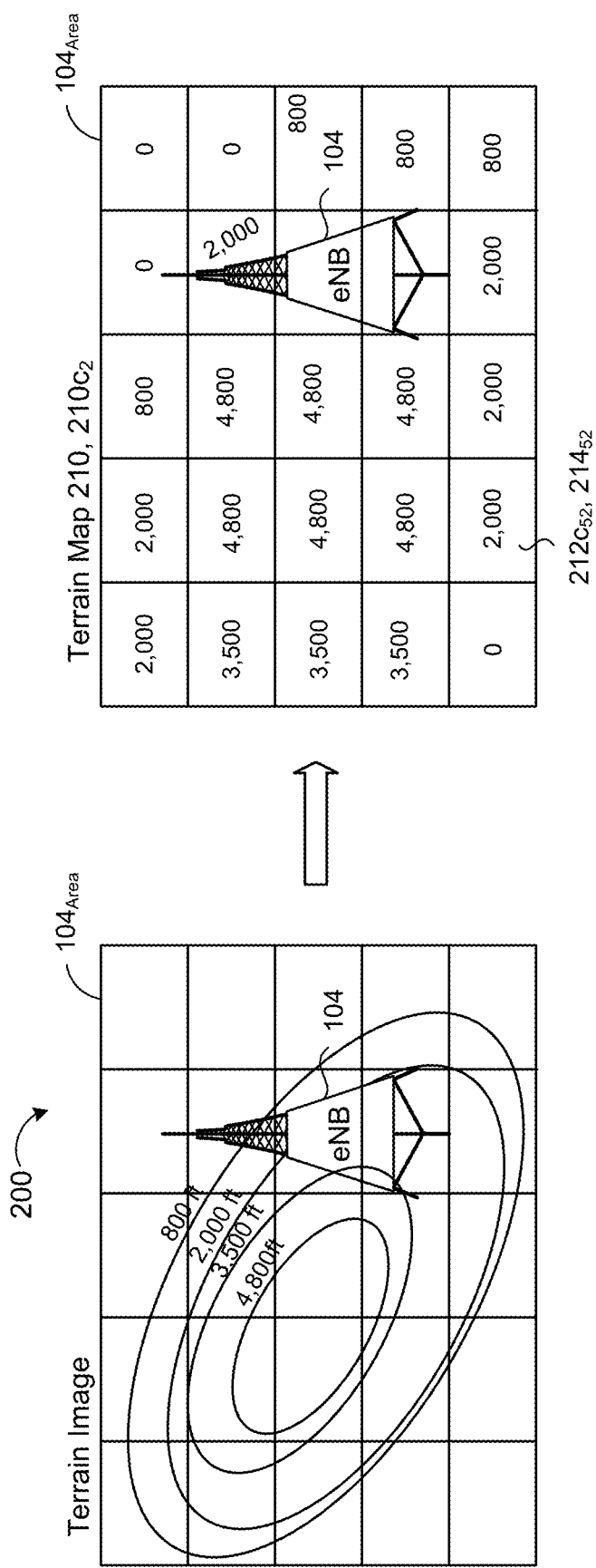

FIGS. 2D and 2E illustrate that other maps 210 may be provided to the modeler 300 to determine an estimated characteristic 312 for a base station 104. In FIGS. 2D and 2E, the mapper 200 generates a terrain map 210, $210c_{1-2}$. The terrain map 210c may include at least one of a terrain altitude of a geographical area associated with the coverage area $104_{area}$ or a presence and/or height of objects extending above a ground surface of the geographical area as the map information 212c. For example, the mapper 200 generates the terrain map 210c from terrain images, such as topography (FIG. 2E) or images of the coverage area $104_{area}$ (FIG. 2D) from which the mapper 200 can determine the presence and/or height of objects. With these images, the mapper 200 may generate various types of terrain maps 210c depending on the granularity desired by an entity such as an operator or a network provider seeking to determine an accurate estimated characteristic 312 of the base station 104. In other words, the complexity of the terrain map 210c that the mapper 200 may generate may vary depending on application and/or design of the modeler 300 and model(s) 310. For example, FIG. 2D illustrates a simple terrain map $210c$ where, much like the observation map $210b_1$, the mapper 200 generates metrics 212c corresponding the terrain (e.g., based on a terrain image). In FIG. 2D, the mapper 200 uses a binary metric 212c to assign geographic portions 214 with a "1" value when the terrain contains an object or feature (e.g., a river or a forest) and to assign geographic portions 214 with a "0" when the geographic portion 214 does not contain a terrain object or feature. For example, the terrain map $210c_1$ of FIG. 2D includes a "1" value in each geographic portion 214 (e.g., pixel or cell) of columns one and two because of the river and the forest in the terrain image.

FIG. 2E is a more complicated terrain map $210c2$. The terrain image corresponding to terrain map $210c2$ is a topographical map identifying elevation within the coverage area $104_{area}$. The mapper 200 may generate several different terrain maps 210c with varying map information 212 relating to the elevation information. Some examples include, terrain maps 210c designing, as the map information 212, the extrema within a geographic portion 214, the average elevation for the respective geographic portion 214, and/or a metric to designate elevations that may be predetermined to pose an issue with determining estimated characteristics 312 for a base station 104. In the example of FIG. 2E, each geographic portion 214 has map information 212c corresponding to the maxima elevation height within the geographic portion 214. For example, geographic portion $214_{52}$ has a maxima elevation height of 2,000 feet based on the topography image.

In other configurations, the mapper 200 providers the modeler 300 with another map 210, a timing advance map 210d, whose map information 212 includes a measured timing advance 212d. The measured timing advance 212d corresponds to an estimate of how far the UE device 102 is from the base station 104. Generally, the timing advance is a measurement performed by a UE device 102 such that, for example, when the UE device 102 generates radio signal measurements 132 (e.g., RSSI, RSRP, or RSRQ), the UE device 102 also measures the timing advance (i.e. generates a measured timing advance 212d).

In other examples, the mapper 200 provides the modeler 300 with a location uncertainty map 210e. For example, the location uncertainty map 210e corresponds to a radio signal measurement 132 (e.g., signal strength measurement such as RSSI, RSRP, RSRQ) generated by the UE device 102 at a given location (e.g., location X) where the radio signal measurement 132 also indicates a location uncertainty 212e of some distance Y. The location uncertainty map 210e may be a map 210 of the location uncertainty 212e or a map 210 of a statistic relating to the location uncertainty 212e. For example, the location uncertainty map 210e is divided into geographic portions 214 (e.g., pixel or cell) where each geographic portion 214 represents an average of location uncertainties 212e from radio signal measurements 132 within a geographic portion 214. Although coverage maps 210a, observations maps 210b, and terrain maps 210c are discussed in detail, any map 210 may be provided to the modeler 300 to compile more data for the model 300 to effectively provide an estimated characteristic 312 for a base station 104.

Figure 3A:
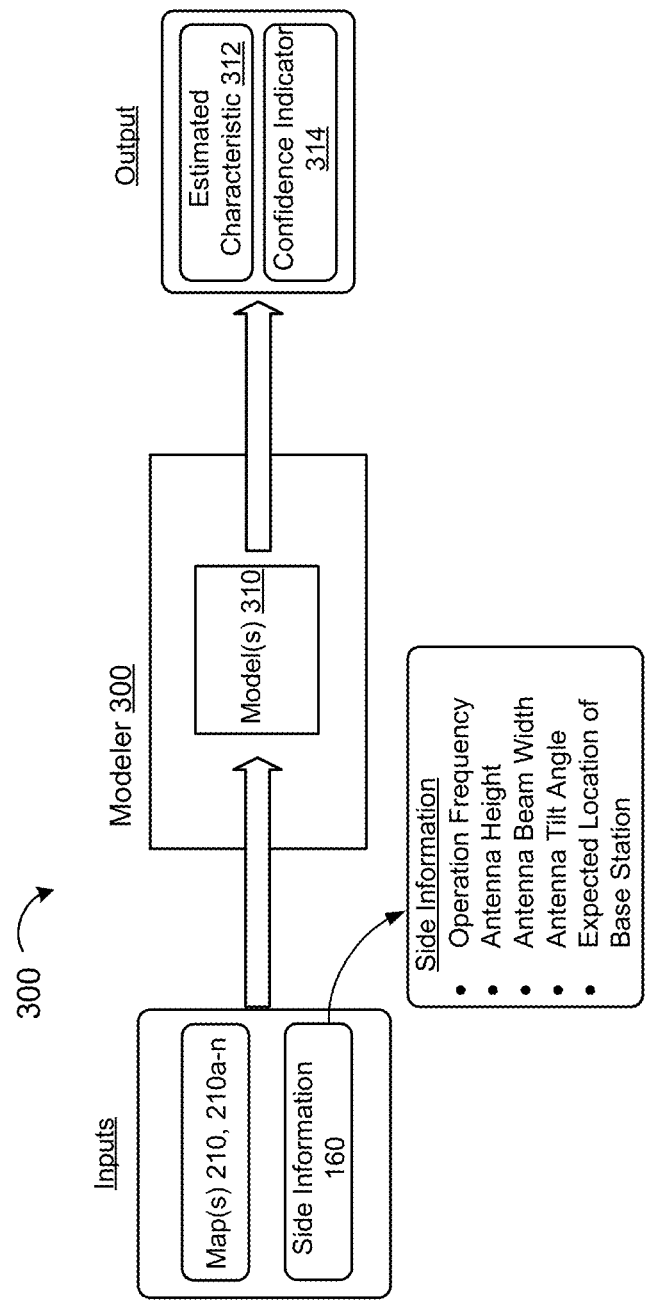
FIG. 3A is a schematic view of an example modeler with corresponding inputs and outputs.
Figure 3B:
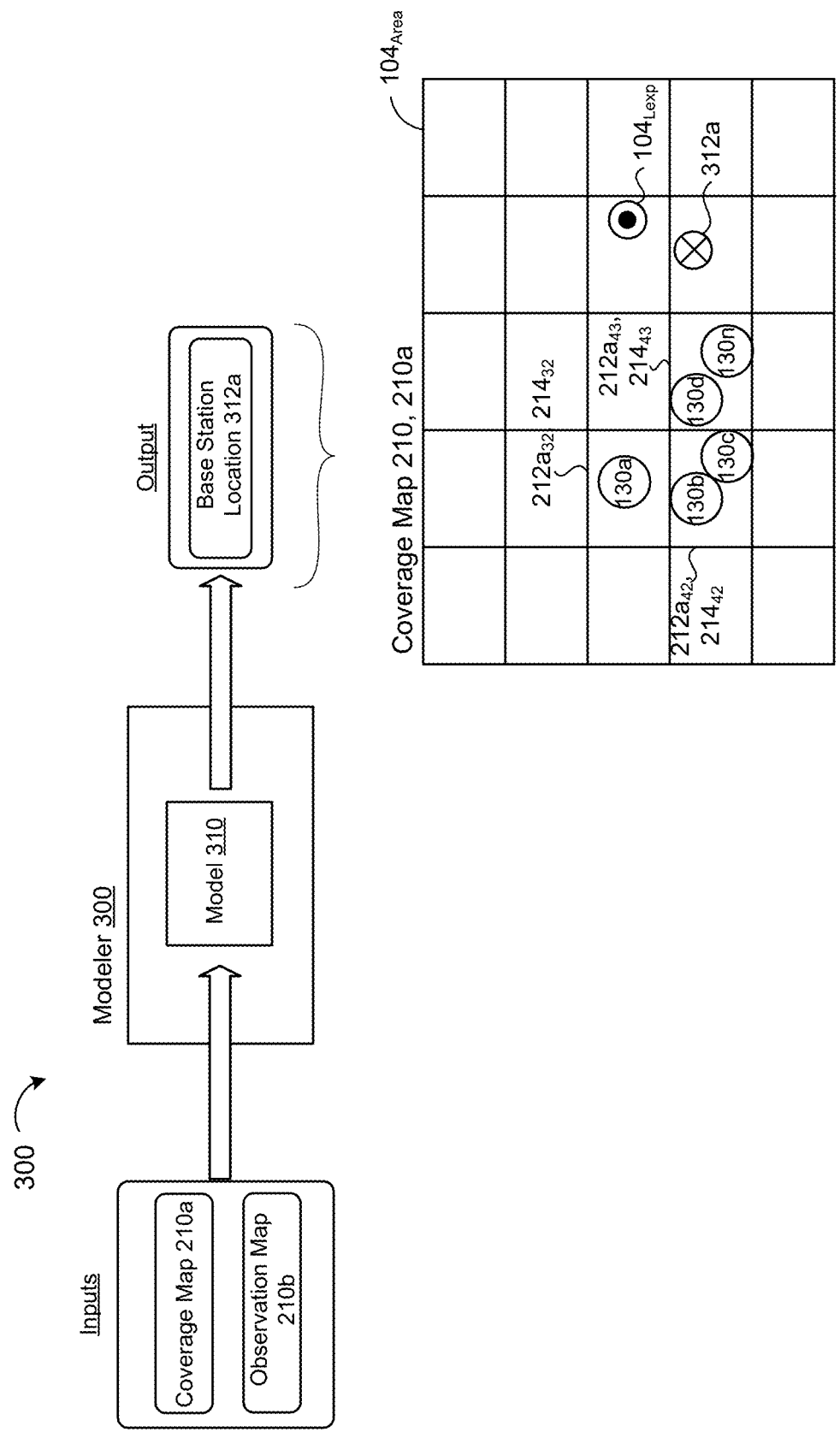
FIGS. 3B and 3C are schematic views of example modelers with illustrated estimated outputs.
Figure 3C:
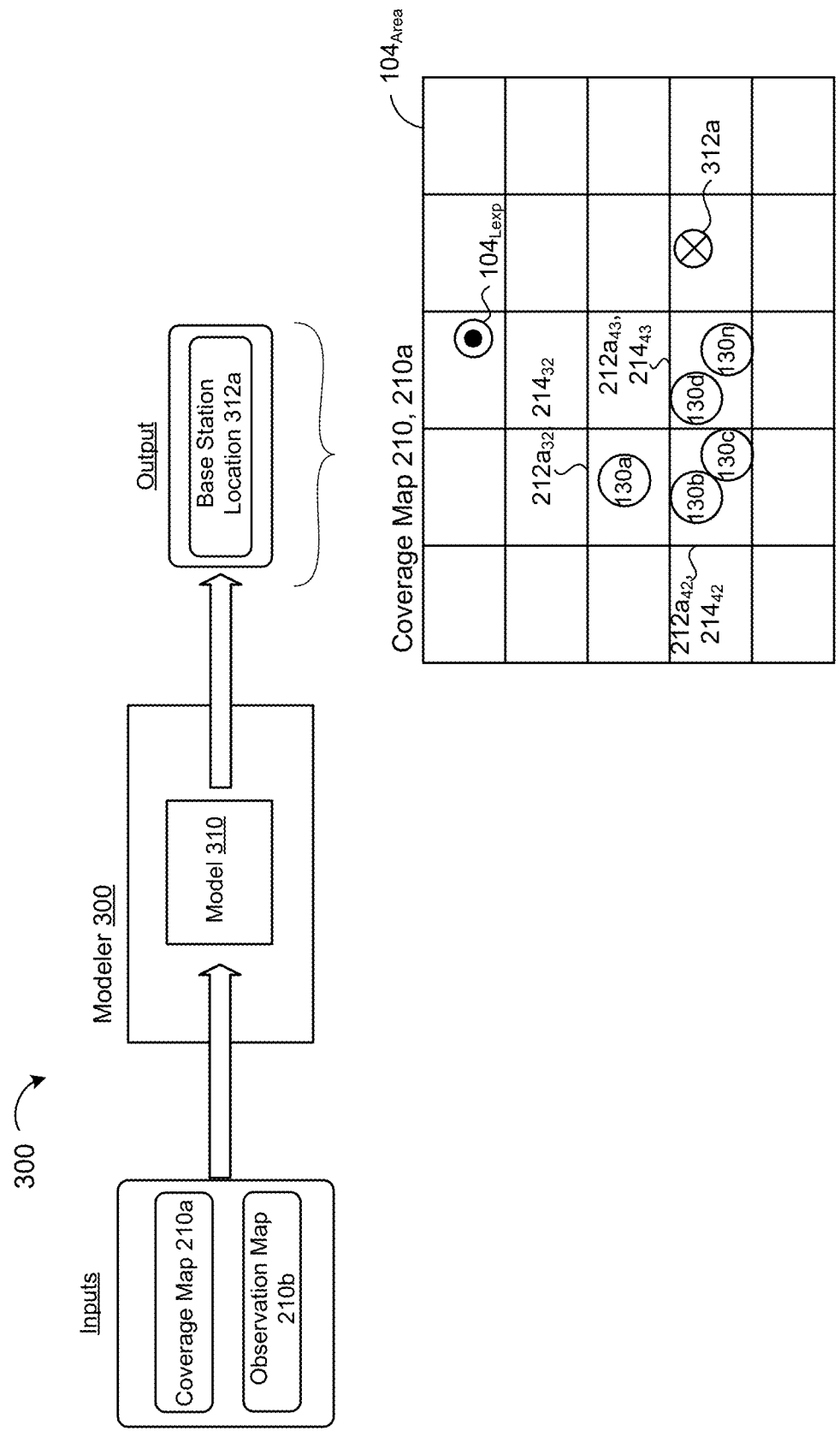

FIGS. 3A-3C are examples of the modeler 300. The modeler 300 is configured to receive maps 210 and/or side information 160. With the map(s) 210 and/or side information 160, the modeler 300 uses at least one model 310 to determine an estimated characteristic 312 and/or confidence indicator 314 for the estimated characteristic 312. The side information 160 fed into the modeler 300 may include at least one of frequency of operation of a base station 104, a height of an antenna of the base station 104, an antenna beam width, an antenna tilt angle, a predetermined (i.e. expected) location $104_{Lexp}$ of the base station 104, or any other parameter associated with the base station 104. In configurations where the modeler 300 receives side information 160 in addition to the map(s) 210, the modeler 300 does not receive, as side information 160, information related to the estimated characteristic 312. The information related to the estimated characteristic 312 may be later compared to the estimated characteristic 312 for identification of anomalies or discrepancies with the network 100. In other words, the modeler 300 may be configured such that estimated characteristic 312 (i.e. output of the modeler 300) is never an input (e.g., side information 160 or map information 212).

FIG. 3B is an example where the modeler 300 does not receive side information 160. Here, the inputs to the modeler 300 are the coverage map 210a indicating radio signal characteristics 212a and the observation map 210b based on metrics 212b relating to observations 130. In some examples, the modeler 300 receives more than one observation map 210b as an input (e.g., a first observation map $210b_1$ with a binary metric $212b$ and a second observation map $210b2$ with a metric $212b$ relating to the number N of observations 130. Using at least one model 310 (e.g., a neural network 310), the modeler 300 outputs an estimated characteristic 312 (e.g., the estimated location $312a$ of the base station 104). As shown in FIGS. 3B and 3C, the estimated location $312a$ of the base station 104 may be mapped and/or compared to a map 210 identifying an expected location $104_{Lexp}$ of the base station 104. FIGS. 3B and 3C indicate the estimated location $312a$ with a circle containing an "X" and the expected location $104L_{exp}$ of the base station 104 with a bullseye shape. In FIG. 3B, the expected location $104L_{exp}$ of the base station 104 and the estimated location $312a$ are nearby and not a significant discrepancy. FIG. 3C, on the other hand, indicates that the estimated location $312a$ of the base station 104 significantly deviate from the expected location $104L_{exp}$ of the base station 104. With an identified discrepancy or anomaly, an entity (e.g., network administrator, operator or network provider) may look to the confidence indicator 314 to further understand the identified discrepancy or anomaly. In some implementations, the entity identifies a ratio of the prediction error to the uncertainty (i.e. confidence indicator 314) where the prediction error corresponds to the apparent deviation between the estimated characteristic 312 and the expected characteristic. For example, a large prediction error between the expected location $104_{Lexp}$ of the base station 104 and the estimated location $312a$ (e.g., FIG. 3C) appears justified by a large uncertainty for the confidence indicator 314; whereas, a large prediction error between the expected location $104_{Lexp}$ of the base station 104 and the estimated location $312a$ appears troublesome with a high confidence indicator 314.

Figure 4:
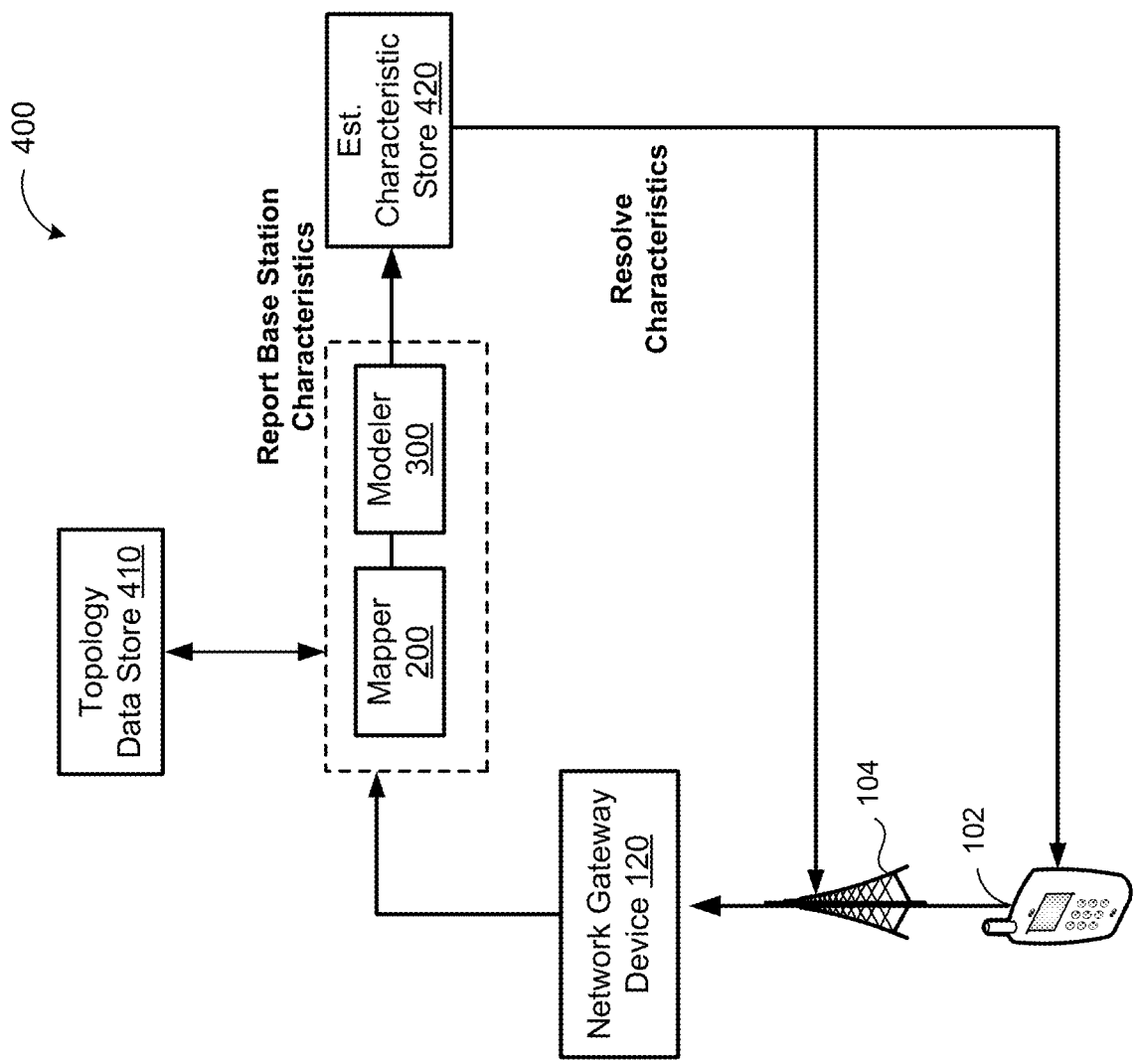
FIG. 4 is a schematic view of an example communication network with data stores.

FIG. 4 is another example of a communication network 400. In this example, the mapper 200 may receive the observations 130 from data processing hardware 122 of the network gateway device 120 or from a topology data store 410 (e.g., a central server). The topology data store 410 may continuously scan the communication network 400 to receive measurement data from UE devices 102. The measurements may then be interpreted as observations 130 that the mapper 200 may use to generate maps 210 for the model 310 to determine an estimated characteristic 312 for a base station 104. With continuous scanning of the topology data store 410, the communication network 400 may seek to resolve issues that UE devices 102 encounter with the communication network 400 using the combination of the mapper 200 and the modeler 300 to detect issues with base station parameters. In some examples, an estimated characteristic store 420 stores the estimated characteristics 312 determined by the modeler 300. By storing the estimated characteristics 312, the communication network 400 may be able to queue encountered issues to later repair and resolve. In some examples, these identified issues are resolved at the base station 104 and/or UE device 102. Additionally or alternatively, the estimated characteristic store 420 may provide a data sets for models 310 of the modeler 300 to further learn via machine learning models and/or neural network models. Learning from these data sets may further hone a predictive accuracy of the models 310 of the modeler 300 to determine estimated characteristics 312 of the base station 104. In some configurations, the estimated characteristic store 420 and/or the topology data store 410 can create numerous data sets and/or maps to utilize the data contained therein to train a model 310 of the modeler 300. For example, the observations 130 sent from the UE devices 102 and collected by the topology data store 410 may create more than one learning map 210 from the same set of data by translating, rotating, or inverting about an axis an initial generated map 210 of a set of data. With potentially volumes of observations 130 collected at the topology data store 410 combined with the ability to generate multiple learning maps 210 for a model 310 with one data set, the topology data store 410 may function as a powerful tool to train models 310 for the modeler 300.

Figure 5:
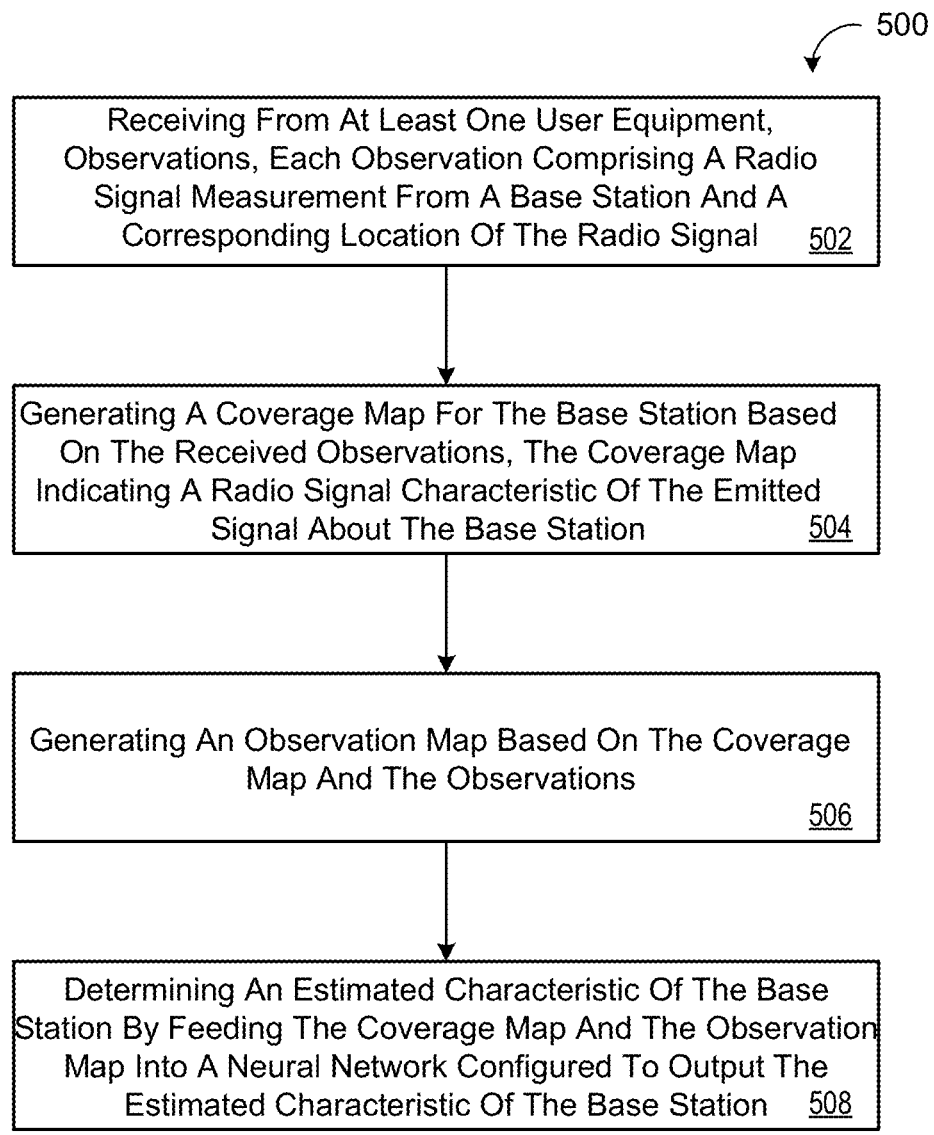
FIG. 5 is a flow chart of an example method for detecting signal coverage problems.

FIG. 5 illustrates a method 500 for detecting radio coverage problems based on UE devices 102 and observations 130 within a coverage area $104_{area}$ of a base station 104. While the method is described with respect to radio base stations, the method may also be applied to television stations, WiFi access points and coverage maps, and other communication devices. At block 502, the method 500 includes receiving from at least one UE 102 observations 130. Each observation 130 including a radio signal measurement 132 from a base station 104 and a corresponding location 134 of the radio signal S. At block 504, the method 500 further includes generating, by data processing hardware, a coverage map $210a$ for the base station 104 based on the received observations 130. The coverage map $210a$ indicates a radio signal characteristic $212a$ of the emitted signal S of about the base station 104. At block 506, the method 500 also includes generating an observation map $210b$ based on the coverage map $210a$ and the observations 130. At block 508, the method 500 further includes determining, by data processing hardware, an estimated characteristic 312 of the base station 104 by feeding the coverage map $210a$ and the observation map $210b$ into a neural network 310 configured to output the estimated characteristic 312 of the base station 104.

Figure 6:
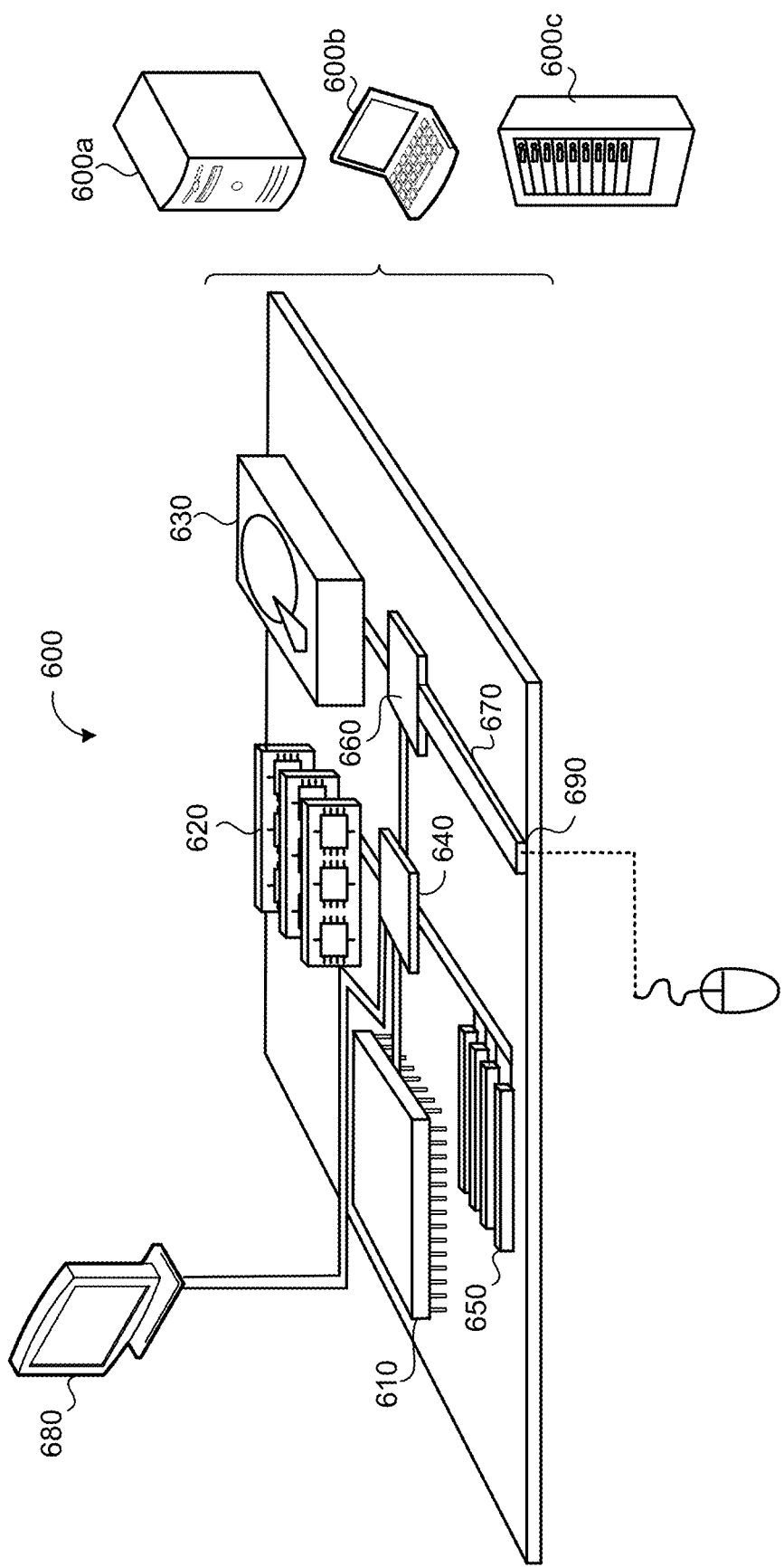
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 660, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware, from multiple user equipment (UE) devices in communication with a base station, observations, each observation comprising a signal measurement of a signal emitted from the base station to a corresponding one of the multiple UE devices and a corresponding location of the corresponding UE device at a time the corresponding UE device transmits the signal measurement of a respective observation to the data processing hardware;
feeding, by the data processing hardware, a predicted location of the base station into a neural network, the neural network configured to output an estimated characteristic of the base station and to output a confidence indicator for the estimated characteristic of the base station, the confidence indicator representing an uncertainty of the estimated characteristic;
generating, by the data processing hardware, a coverage map for the base station based on the received observations, the coverage map indicating a signal characteristic of the emitted signal about the base station;
determining, by the data processing hardware, the estimated characteristic of the base station by feeding the coverage map into the neural network, the estimated characteristic of the base station comprising an estimated location of the base station;
determining, by the data processing hardware, a prediction error based on (i) a deviation between the predicted location of the base station and the estimated location of the base station and (ii) the confidence indicator associated with the estimated characteristic output by the neural network; and
communicating, by the data processing hardware, the prediction error to an issue queue at a network entity administrator.

2. The method of claim 1, wherein generating the coverage map for the base station comprises:
dividing a coverage area about the base station into pixels, each pixel corresponding to a geographical portion of the coverage area;
for each observation:
identifying the pixel having the corresponding geographical portion of the coverage area that contains the location of the corresponding UE device at the time the corresponding UE device transmits the signal measurement of the respective observation; and
associating the observation with the identified pixel; and
for each pixel, averaging the signal measurements of any observations associated with a respective pixel.

3. The method of claim 2, wherein the coverage map comprises a grid having cells, and each pixel corresponds to one of the cells.

4. The method of claim 2, further comprising:
generating, by the data processing hardware, an observation map based on the coverage map and the observations; and
determining, by the data processing hardware, the estimated characteristic of the base station by feeding the coverage map and the observation map into the neural network configured to output the estimated characteristic of the base station.

5. The method of claim 4, wherein generating the observation map comprises, for each pixel of the coverage map, generating a metric that monotonically expresses a number of any observations associated with the respective pixel.

6. The method of claim 5, wherein the metric comprises at least one of:
a number of any observations associated with the respective pixel;
a log of the number of any observations associated with the respective pixel; or
a monotonic function of the number of any observations associated with the respective pixel.

7. The method of claim 5, wherein generating the metric comprises:
determining a number of any observations associated with the respective pixel;
when the number is greater than zero, assigning a value of the respective pixel to one; and
when the number equals zero, assigning the value of the respective pixel to zero.

8. The method of claim 2, further comprising:
generating a terrain map of a geographical area about the base station; and
feeding the terrain map into the neural network.

9. The method of claim 8, wherein the terrain map describes at least one of:
a terrain altitude of the geographical area; or
a presence and/or height of objects extending above a ground surface of the geographical area.

10. The method of claim 1, further comprising feeding, by the data processing hardware, side information comprising at least one of a frequency of operation of the base station, a height of an antenna of the base station, an antenna beam width, or an antenna tilt angle.

11. The method of claim 1, wherein the estimated characteristic of the base station further comprises an estimated pointing direction of the base station or an antenna azimuth of the base station.

12. The method of claim 1, wherein the signal measurement comprises a location uncertainty measurement.

13. The method of claim 12, further comprising:
generating, by the data processing hardware, a location uncertainty map based on location uncertainty measurements; and
determining, by the data processing hardware, the estimated characteristic of the base station by feeding the coverage map and the location uncertainty map into the neural network configured to output the estimated characteristic of the base station.

14. The method of claim 13, wherein generating the location uncertainty map for the base station comprises:
dividing a coverage area about the base station into pixels, each pixel corresponding to a geographical portion of the coverage area;
for each observation:
identifying the pixel having the corresponding geographical portion of the coverage area that contains the location of the location uncertainty measurement of the respective observation; and
associating the observation with the identified pixel; and
for each pixel, averaging the location uncertainty measurements of any observations associated with a respective pixel.

15. A system comprising:
data processing hardware; and
memory hardware in communication with the data processing hardware, the memory hardware storing instructions that when executed on the data processing hardware cause the data processing hardware to perform operations comprising:

receiving from multiple user equipment (UE) devices in communication with a base station, observations, each observation comprising a signal measurement of a signal emitted from the base station to a corresponding one of the multiple UE devices and a corresponding location of the corresponding UE device at a time the corresponding UE device transmits the signal measurement of a respective observation to the data processing hardware;

feeding a predicted location of the base station into a neural network, the neural network configured to output an estimated characteristic of the base station and to output a confidence indicator for the estimated characteristic of the base station, the confidence indicator representing an uncertainty of the estimated characteristic;

generating a coverage map for the base station based on the received observations, the coverage map indicating a signal characteristic of the emitted signal about the base station;

determining the estimated characteristic of the base station by feeding the coverage map into the neural network, the estimated characteristic of the base station comprising an estimated location of the base station;

determining a prediction error based on (i) a deviation between the predicted location of the base station and the estimated location of the base station and (ii) the confidence indicator associated with the estimated characteristic output by the neural network; and communicating, by the data processing hardware, the prediction error to an issue queue at a network entity administrator.

16. The system of claim 15, wherein the operation of generating the coverage map for the base station further comprises:

dividing a coverage area about the base station into pixels, each pixel corresponding to a geographical portion of the coverage area;

for each observation:
identifying the pixel having the corresponding geographical portion of the coverage area that contains the location of the corresponding UE device at the time the corresponding UE device transmits the signal measurement of the respective observation; and
associating the observation with the identified pixel; and for each pixel, averaging the signal measurements of any observations associated with a respective pixel.

17. The system of claim 16, wherein the coverage map comprises a grid having cells, and each pixel corresponds to one of the cells.

18. The system of claim 16, wherein the operation further comprise:

generating an observation map based on the coverage map and the observations; and determining the estimated characteristic of the base station by feeding the coverage map and the observation map into the neural network configured to output the estimated characteristic of the base station.

19. The system of claim 16, wherein the operation of generating the observation map further comprises, for each pixel of the coverage map, generating a metric that monotonically expresses a number of any observations associated with the respective pixel.

20. The system of claim 19, wherein the metric comprises at least one of:
a number of any observations associated with the respective pixel;
a log of the number of any observations associated with the respective pixel; or
a monotonic function of the number of any observations associated with the respective pixel.

21. The system of claim 19, wherein generating the metric further comprises:
determining a number of any observations associated with the respective pixel;
when the number is greater than zero, assigning a value of the respective pixel to one; and
when the number equals zero, assigning the value of the respective pixel to zero.

22. The system of claim 16, wherein the operations further comprise:
generating a terrain map of a geographical area about the base station; and
feeding the terrain map into the neural network.

23. The system of claim 22, wherein the terrain map describes at least one of:
a terrain altitude of the geographical area; or
a presence and/or height of objects extending above a ground surface of the geographical area.

24. The system of claim 16, wherein the operations further comprise feeding side information comprising at least one of a frequency of operation of the base station, a height of an antenna of the base station, an antenna beam width, or an antenna tilt angle.

25. The system of claim 16, wherein the estimated characteristic of the base station further comprises an estimated pointing direction of the base station or an antenna azimuth of the base station.

26. The system of claim 15, wherein the signal measurement comprises a location uncertainty measurement.

27. The system of claim 26, wherein the operations further comprise:
generating a location uncertainty map based on location uncertainty measurements; and
determining the estimated characteristic of the base station by feeding the coverage map and the location uncertainty map into the neural network configured to output the estimated characteristic of the base station.

28. The system of claim 27, wherein generating the location uncertainty map for the base station comprises:
dividing a coverage area about the base station into pixels, each pixel corresponding to a geographical portion of the coverage area;
for each observation:
identifying the pixel having the corresponding geographical portion of the coverage area that contains the location of the location uncertainty measurement of the respective observation; and
associating the observation with the identified pixel; and
for each pixel, averaging the location uncertainty measurements of any observations associated with a respective pixel.

29. The method of claim 1, wherein communicating the prediction error to the issue queue at the network entity administrator occurs based on a ratio of the deviation between the predicted location of the base station and the estimated location of the base station and the confidence indicator associated with the estimated characteristic output by the neural network.

30. The system of claim 1, wherein communicating the prediction error to the issue queue at the network entity administrator occurs based on a ratio of the deviation between the predicted location of the base station and the estimated location of the base station and the confidence indicator associated with the estimated characteristic output by the neural network.

* * * * *